United States Patent
Zhao et al.

(10) Patent No.: US 12,151,810 B2
(45) Date of Patent: Nov. 26, 2024

(54) TAILSTOCK TYPE VERTICAL TAKE-OFF AND LANDING UNMANNED AERIAL VEHICLE AND CONTROL METHOD THEREOF

(71) Applicant: ZHEJIANG UNIVERSITY, Hangzhou (CN)

(72) Inventors: Wenjie Zhao, Hangzhou (CN); Zheng Chen, Hangzhou (CN); Xueming Shao, Hangzhou (CN); Jun Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 465 days.

(21) Appl. No.: 17/544,813

(22) Filed: Dec. 7, 2021

(65) Prior Publication Data

US 2022/0097849 A1    Mar. 31, 2022

Related U.S. Application Data (63) Continuation of application No. PCT/CN2020/130451, filed on Nov. 20, 2020.

(30) Foreign Application Priority Data

Sep. 30, 2020  (CN) .......................... 202011059838.X (51) Int. Cl.
*B64C 29/02* (2006.01)
*B64C 3/40* (2006.01)
(Continued)

(52) U.S. Cl.
CPC ................ *B64C 29/02* (2013.01); *B64C 3/40* (2013.01); *B64C 5/02* (2013.01); *B64C 5/06* (2013.01);
(Continued)

(58) Field of Classification Search
CPC ........... B64C 29/02; B64C 15/14; B64C 3/56; B64U 70/80; B64U 30/12; B64U 30/40;
(Continued)

(56) References Cited

U.S. PATENT DOCUMENTS

| 4,531,693 A | * | 7/1985 | Raynaud | ................. B64C 15/14 244/3.22 |
| 2004/0084564 A1 | * | 5/2004 | John | ..................... F42B 10/663 244/3.21 |

FOREIGN PATENT DOCUMENTS

| BE | 856661 A1 | 1/1978 |
| CN | 102466429 A | 5/2012 |

(Continued)

OTHER PUBLICATIONS

International Search Report (PCT/CN2020/130451); Date of Mailing: Jun. 30, 2021.

(Continued)

*Primary Examiner* — Nicholas McFall
*Assistant Examiner* — Terri L Filosi
(74) *Attorney, Agent, or Firm* — W&G Law Group (57) ABSTRACT

Provided is a tailstock type vertical take-off and landing unmanned aerial vehicle and a control method thereof. The unmanned aerial vehicle is mainly composed of a fuselage, wings, ailerons, empennages, an elevator, a rudder, an engine, an attitude adjustment nozzle, a landing gear, and the like. The wings are symmetrically arranged on both sides of the middle of the fuselage; the ailerons are hinged to the trailing edges of the wings on the both sides; the empennages are located at the tail of the fuselage, and a form of vertical empennages+horizontal empennages or V-shaped (Continued)

empennages can be used; the elevator and rudder are hinged to the trailing edges of the empennages; the engine is arranged at the tail of the fuselage for producing main thrust.

7 Claims, 6 Drawing Sheets

(51) Int. Cl.
| | |
|---|---|
| B64C 5/02 | (2006.01) |
| B64C 5/06 | (2006.01) |
| B64C 5/10 | (2006.01) |
| B64C 9/00 | (2006.01) |
| B64C 15/14 | (2006.01) |
| B64C 25/04 | (2006.01) |
| B64C 25/16 | (2006.01) |
| B64D 27/20 | (2006.01) |
| B64U 10/25 | (2023.01) |
| B64U 70/80 | (2023.01) |
| G05D 1/00 | (2006.01) |
| B64U 50/12 | (2023.01) |

(52) U.S. Cl.
CPC ............... *B64C 5/10* (2013.01); *B64C 9/00* (2013.01); *B64C 15/14* (2013.01); *B64C 25/04* (2013.01); *B64C 25/16* (2013.01); *B64D 27/20* (2013.01); *B64U 10/25* (2023.01); *B64U 70/80* (2023.01); *G05D 1/042* (2013.01); *B64C 2009/005* (2013.01); *B64U 50/12* (2023.01)

(58) Field of Classification Search
CPC ......... B64G 1/006; B64G 1/002; F42B 10/14; F42B 10/66
See application file for complete search history.

(56) References Cited

FOREIGN PATENT DOCUMENTS

| | | |
|---|---|---|
| CN | 103224021 A | 7/2013 |
| CN | 204279944 U | 4/2015 |
| CN | 105947187 A | 9/2016 |
| CN | 106428548 A | 2/2017 |
| CN | 107745811 A | 3/2018 |
| CN | 209535459 U | 10/2019 |
| CN | 111413871 A | 7/2020 |
| GB | 2190636 B | 12/1989 |
| JP | H0534096 A | 2/1993 |

OTHER PUBLICATIONS

First Office Action(202011059838.X); Date of Mailing: Sep. 8, 2021.

Second Office Action(202011059838.X); Date of Mailing: Oct. 26, 2021.

* cited by examiner

TAILSTOCK TYPE VERTICAL TAKE-OFF AND LANDING UNMANNED AERIAL VEHICLE AND CONTROL METHOD THEREOF

CROSS-REFERENCE TO RELATED APPLICATIONS

The present application is a continuation of International Application No. PCT/CN2020/130451, filed on Nov. 20, 2020, which claims priority to Chinese Application No. 202011059838.x, filed on Sep. 30, 2020, the contents of both of which are incorporated herein by reference in their entireties.

TECHNICAL FIELD

The present invention relates to the field of unmanned aerial vehicles and aviation aircrafts and, in particular, relates to a tailstock type vertical take-off and landing unmanned aerial vehicle and a control method thereof.

BACKGROUND

In recent years, with the widespread application of unmanned aerial vehicles in various military and civilian fields, their use environments and operational tasks have become increasingly complex. The convenience and safety of take-off and landing solutions are important factors that determine the continuous operation capability of the unmanned aerial vehicles in harsh environments such as sea surfaces and mountainous areas. Therefore, the functional characteristics of vertical take-off and landing are of great significance to the application and expansion of the unmanned aerial vehicles. Helicopters and fixed-wing unmanned aerial vehicles have their respective advantages in vertical take-off and landing and high-speed cruising, and how to fully combine the two advantages will be the core issue that determines the initiative in future air combats.

A tilt rotor is currently the most widely studied vertical take-off and landing-high-speed cruising technology, the conversion of a vertical take-off and landing mode and a cruising mode can be realized through a tilting mechanism of an engine or a rotor, although this type of method can complement the advantages of the helicopter and the fixed-wing unmanned aerial vehicle for each other, due to the complexity of the wing surface and the tilting mechanism, the resistance and a radar reflection cross section (RCS) of the unmanned aerial vehicle are greatly increased, and its cruising capability and stealth performance are reduced. The U.S. Navy's F35C carrier-based fighter jet achieves vertical take-off and landing through engine vector nozzles, lift fans and nozzles arranged on the surface of the wings, but its control system is complicated, and the dedicated lift fans at the take-off and landing stage occupy a larger space and specific gravity, and the control difficulty is high, which makes it difficult to popularize and use this solution on other models. Therefore, there is an urgent need for a vertical take-off and landing unmanned aerial vehicle that can give full play to the vertical take-off and landing function of the helicopter and the high-speed cruising function of the fixed wing, and is simple, universal and propagable at the same time, and a control method thereof, so as to provide a technical support for safe take-off and landing in complex environments such as on sea and wooded mountains.

SUMMARY

The present invention proposes a tailstock type vertical take-off and landing unmanned aerial vehicle and a control method thereof. The unmanned aerial vehicle can realize tailstock type vertical take-off and landing and high-speed cruising by means of the coordinated control among an attitude adjustment nozzle, an engine, a aerodynamic rudder surface and a landing gear, thereby providing a new solution for the vertical take-off and landing in complex take-off and landing environments such as sea and mountainous areas.

The technical solution adopted by the present invention is:

The present invention first discloses a tailstock type vertical take-off and landing unmanned aerial vehicle. The unmanned aerial vehicle includes: a fuselage, wings, ailerons, empennages, an elevator, a rudder, an engine, an attitude adjustment nozzle, a landing gear, and the like. The wings are symmetrically fixed on both sides of the middle of the fuselage, and the ailerons are hinged to the trailing edges of the wings on the both sides; the empennages are located at the tail of the fuselage, a layout can be utilized in which a vertical stabilizing plane and a horizontal stabilizing plane are independent of each other, that is, the empennages include one or more vertical empennages and one or more horizontal empennages, and V-shaped empennages can also be utilized in which the vertical stabilizing plane and the horizontal stabilizing plane are coupled to each other; the elevator and rudder are hinged to the trailing edges of the empennages; the engine is arranged at the tail of the fuselage for producing forward thrust; the attitude adjustment nozzle is composed of a plurality of nozzles, which are distributed on the outer surface of the front of the fuselage, are away from the center of gravity of the unmanned aerial vehicle, and can spray gas outward to generate thrust and a rotation torque, so as to assist in adjusting the attitude of the unmanned aerial vehicle; and the landing gear is arranged at the tail of the fuselage, can be automatically folded and unfolded, and is configured to support the unmanned aerial vehicle to achieve the vertical take-off and landing thereof.

In certain embodiments, the fuselage can be designed as a streamline form with an eudipleural cross section, and meanwhile can be designed as a wing-body fusion body. However, in order to minimize the wind disturbance at the take-off and landing stage and to improve the stability of posture control, the best choice for the cross section of the fuselage is a circle.

In certain embodiments, the wing can be a straight wing, which is arranged above or below the fuselage, and can be folded, unfolded and locked driven by a mechanical structure, the sweepback of the wing can be adjusted to obtain optimal lift-drag characteristics at different speeds, the windward area of a wing-fuselage combination can be effectively reduced after folding, thereby reducing the wind disturbance at the take-off and landing stage, which in return improves the stability of the attitude control; the ailerons are composed of two or more ailerons, which are hinged to the trailing edges of the left and right wings through rotating shafts, the left and right ailerons are symmetrically distributed, and can deflect driven by a steering engine and a transmission mechanism, so as to manipulate the unmanned aerial vehicle to rotate in a rolling direction.

In certain embodiments, the empennages are located at the tail of the fuselage, a layout can be utilized in which a vertical stabilizing plane and a horizontal stabilizing plane are independent of each other, that is, the empennages include one or more vertical empennages and one or more horizontal empennages, and V-shaped empennages can also be utilized in which the vertical stabilizing plane and the horizontal stabilizing plane are coupled to each other; the empennages are eudipleural about the fuselage, and can be folded, unfolded and locked driven by the mechanical structure, the windward area of a empennage-fuselage combination can be effectively reduced after folding, thereby reducing the wind disturbance at the take-off and landing stage, which in return improves the stability of the attitude control; and the elevator and the rudder are hinged to the trailing edges of the empennages through the rotating shafts, and can deflect driven by the steering engine and the transmission mechanism, so as to manipulate the unmanned aerial vehicle to realize pitching and rotation in a yawing direction.

In certain embodiments, the engine is located at the tail of the fuselage, one or more turbojet engines or turbofan engines with relatively high thrust weights can be adopted, the engine adopts a fixed nozzle or a vector nozzle to improve the attitude and maneuvering control flexibility, the maximum available thrust of the engine should not be less than the take-off weight of the unmanned aerial vehicle. It is appreciated that the maximum available thrust is greater than 1.2 times of the take-off weight of the unmanned aerial vehicle.

In certain embodiments, the attitude adjustment nozzle is composed of a plurality of (such as 4) nozzles, which are distributed on the outer surface of the front of the fuselage, are away from the center of gravity of the unmanned aerial vehicle, point to the outside of the fuselage, and can generate thrust and the rotation torque, so as to assist in adjusting the attitude of the unmanned aerial vehicle. In order that the attitude adjustment nozzle can generate a rolling torque, the center lines of some or all (recommended) nozzles may not pass through the center axis of the fuselage of the unmanned aerial vehicle. Thrust of each nozzle can be independently controlled, through the combined manipulation of the various nozzles, the torques in the rolling, pitching and yawing directions can be generated, thereby assisting an aerodynamic rudder surface to perform attitude control in a cruising or maneuvering flight state, and a main attitude adjustment torque can be provided during the vertical take-off and landing process.

In certain embodiments, the landing gear is arranged at the tail of the fuselage, can adopt a three-point or four-point supporting structure, and can realize automatic folding and unfolding through mechanical parts. In a folded state, a fairing is arranged at the outside to improve the airflow state during the flight process and to reduce the air resistance. After the take-off is completed, the landing gear can be automatically folded, and the fairing is closed; and before landing, the landing gear can be automatically unfolded for buffering and supporting the unmanned aerial vehicle, so as to realize its vertical landing.

The present invention further discloses a vertical take-off control method of the unmanned aerial vehicle: the vertical take-off process of the unmanned aerial vehicle is divided into three stages: ground preparation, vertical rising and mode switching, and the control method of each stage is as follows:

1) ground preparation: the unmanned aerial vehicle can take off on an external launcher or its own landing gear, and in order to minimize the impact of wind interference on the attitude of the unmanned aerial vehicle at the take-off stage, the wings and the empennages are in the folded state before take-off; after the unmanned aerial vehicle is fixed and intact, the system is powered on, the test is completed and the unmanned aerial vehicle enters a standby state, the engine starts and keeps idling, after it is confirmed that the work is normal, the engine starts at a high speed, the rotating speed is gradually accelerated to a high speed state, after the thrust is greater than the gravity, the unmanned aerial vehicle leaves the ground and begins to enter the vertical rising stage;

2) vertical rising: the speed is gradually increased, before the flight speed reaches a specified mode switching speed (greater than a stalling speed of the unmanned aerial vehicle), the wings and the empennages remain the folded state, the landing gear is always in an unfolded state, the position and attitude of the unmanned aerial vehicle are mainly regulated and controlled by the thrust of an engine vector nozzle (if any) and the attitude adjustment nozzle, after the flight speed is greater than the specified mode switching speed, the wings and the empennages are unfolded, the landing gear is folded, and the unmanned aerial vehicle enters the mode switching stage; and 3) mode switching: the engine continues to maintain the high speed state, the rotation in the rolling direction is controlled through the attitude adjustment nozzle at first, so that the belly of the unmanned aerial vehicle is aligned with the direction of the route, and then the attitude adjustment nozzle and the elevator are manipulated to slowly adjust the pitch angle from 90° during the vertical rising process to a trim value in a cruising state, and during this process, the flight height of the unmanned aerial vehicle gradually stabilizes until a cruising flight state is finally established.

The present invention further discloses a vertical landing method of the unmanned aerial vehicle: the vertical landing process of the unmanned aerial vehicle is divided into five stages: heading adjustment, height adjustment, approaching to a landing circle, vertical pulling up and vertical landing, and the control method of each stage is as follows:

1) after entering recovery in the cruising state, the unmanned aerial vehicle firstly enters the heading adjustment stage: according to the horizontal distance between the current position and the landing point (that is, a horizontal distance to be flown) and an height difference, combined with the gliding angle of the unmanned aerial vehicle, whether the ratio of the height difference to the horizontal distance to be flown meets the requirements of the gliding angle is judged: if the horizontal distance is insufficient, the flight distance can be extended by flying around, so that the unmanned aerial vehicle can be lowered to a recovery height before flying to the landing point; after the horizontal distance to be flown meets the height reduction requirements, the heading of the unmanned aerial vehicle is adjusted, so that the unmanned aerial vehicle is aligned with the landing point, and then enters the height adjustment stage;

2) after the heading of the unmanned aerial vehicle is aligned with the direction of the landing point, the unmanned aerial vehicle flies in the heading, at the same time, the flight height is adjusted, so that the height is gradually decreased to the recovery height, and after lowering to the recovery height, the unmanned aerial vehicle enters the stage of approaching to the landing circle;

3) the unmanned aerial vehicle maintains horizontal flight and gradually approaches to the landing circle (an inverted cone with the landing point as the apex), and then enters the vertical pulling up stage;

4) by controlling the engine vector nozzle (if any), the attitude adjustment nozzle and the aerodynamic rudder surface, the pitch angle is quickly pulled to 90-100 degrees, the horizontal speed of the unmanned aerial vehicle will be rapidly decreased, and the unmanned aerial vehicle climbs rapidly at the same time; the attitude and position of the unmanned aerial vehicle are regulated and controlled during this process, so that the unmanned aerial vehicle is kept within the landing circle, and the horizontal position is close to the landing point as much as possible; the rotating speed of the engine, the engine vector nozzle (if any) and the attitude adjustment nozzle are adjusted, so that the rising speed of the unmanned aerial vehicle is gradually decreased to zero, and then the unmanned aerial vehicle enters the vertical landing stage; and 5) the landing gear is unfolded, the wings and the empennages are folded, and the rotating speed of the engine, the engine vector nozzle (if any) and the attitude adjustment nozzle are adjusted, so that the unmanned aerial vehicle maintains a stable descent speed at the horizontal position of the landing point, and gradually reduces the height along the vertical direction; after the height of the unmanned aerial vehicle is reduced to a braking point, the rotating speed of the engine is increased, so that the descent speed is quickly reduced, and the unmanned aerial vehicle slowly lands to the landing point; and then the engine quickly enters an idle state and is stopped after continuously working for a period of time, so as to complete the landing.

In certain embodiments, the tailstock type vertical take-off and landing unmanned aerial vehicle can adopt a composite control method combining aerodynamic force, vector thrust (if any) and reaction thrust, so as to combine the aerodynamic force generated by the rudder surface, the vector thrust generated by the engine vector nozzle (if any) and the reaction thrust generated by the attitude adjustment nozzle. The core part of the composite control system can mainly include a composite control management and decision making module, a composite control and manipulation distribution module, and a control efficiency evaluation module. The composite control management and decision making module gives a composite control solution according to the a flight stage, and an attitude and speed control command given by a track controller; the composite control and manipulation distribution module calculates a required manipulation force and a manipulation torque according to the flight stage and a control deviation, and then performs calculation and distribution on the manipulated variable of each actuator in combination with the model and the composite solution of each actuator; and the control efficiency evaluation module evaluates the effect of the control distribution result and the effect of the composite solution according to the response situation and the control deviation of the unmanned aerial vehicle, and assists the composite control management and decision making module to revise the composite solution.

The beneficial effects of the present invention are mainly manifested in that: the present invention can realize tailstock vertical take-off and landing and high-speed cruising through the coordinated control among the attitude adjustment nozzle, the engine, the aerodynamic rudder surface and the landing gear. The present invention can provide a new technical solution for the safe take-off and landing in complex environments such as sea and wooded mountains.

DESCRIPTION OF EMBODIMENTS

The present invention will be further elaborated and illustrated below in conjunction with the drawings and specific embodiments. The technical features in various embodiments of the present invention can be correspondingly combined if there is no conflict with each other.

Figure 1:
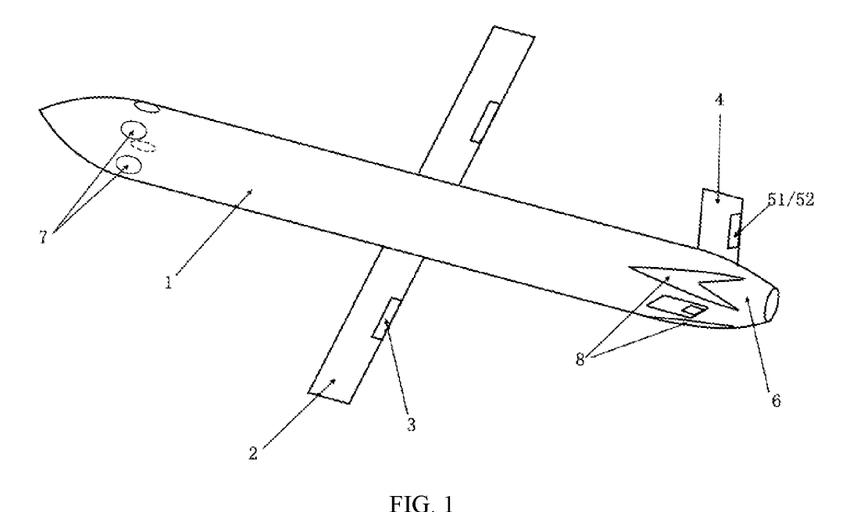
FIG. 1 is a schematic structural diagram of a tailstock type vertical take-off and landing unmanned aerial vehicle.

The present invention proposes a tailstock type vertical take-off and landing unmanned aerial vehicle and a control method. The unmanned aerial vehicle can give full play to the vertical take-off and landing function of a helicopter and the high-speed cruising function of a fixed wing by means of the coordinated control among an attitude adjustment nozzle, an engine, an aerodynamic rudder surface and a landing gear, and provide a technical support for safe take-off and landing in complex environments such as seas and wooded mountains. The specific implementation method is as follows:

The specific embodiment is as follows:

The structural principle of a tailstock type vertical take-off and landing unmanned aerial vehicle is shown in FIG. 1, and the tailstock type vertical take-off and landing unmanned aerial vehicle is mainly composed of the following main parts: a fuselage 1, wings 2 that are symmetrically fixed on both sides of the middle of the fuselage, ailerons 3 for controlling a rolling attitude, empennages 4 for horizontal stabilizing and vertical stabilizing, an elevator and a rudder 51/52 for generating an aerodynamic manipulation torque and controlling the pitch angle and the yawing angle, an engine 6 for generating forward thrust, an attitude adjustment nozzle 7 for assisting in adjusting the attitude of the unmanned aerial vehicle, and a landing gear 8 for supporting the unmanned aerial vehicle.

As shown in FIG. 1, in order to minimize the wind disturbance at the take-off and landing stage and improve the stability of position and attitude control, the fuselage 1 can be cylindrical, and the wings 2 can be flat wings, which are arranged below the fuselage, and X-shaped empennages 4 are designed at the tail. The wings 2 can adopt a straight or scissor-shaped folding solution, and the four empennages can be folded in the same direction synchronously in a beating down manner.

Figure 2:
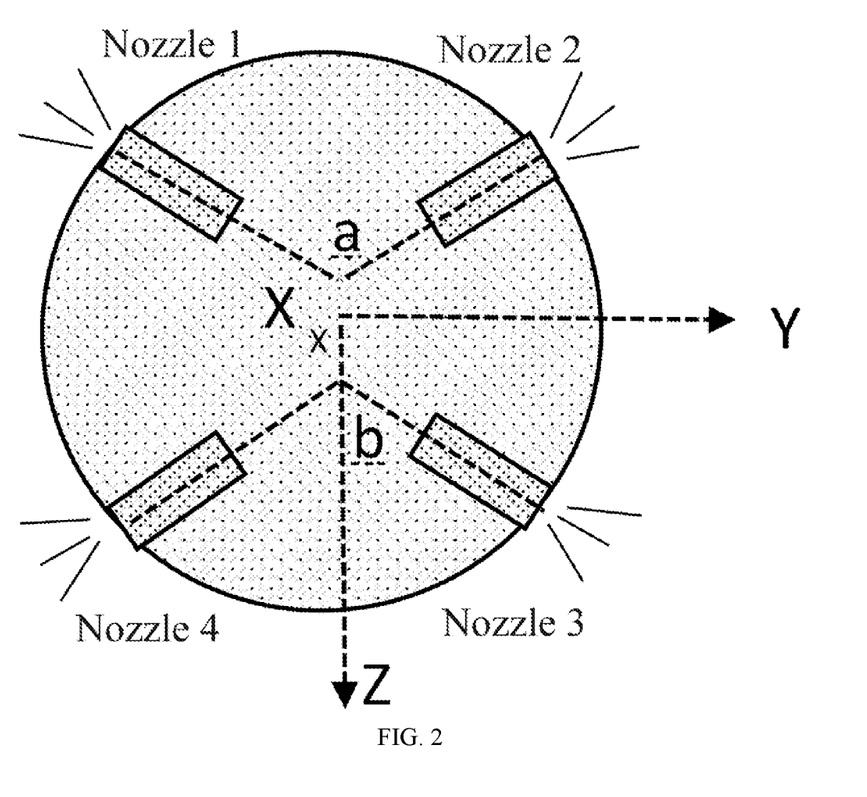
FIG. 2 is a schematic diagram of the function of an attitude adjustment nozzle of a tailstock type vertical take-off and landing unmanned aerial vehicle.

The attitude adjustment nozzle 7 can be composed of a plurality of nozzles, the a plurality of nozzles are distributed on the outer surface of the front part of the fuselage that is away from the center of gravity of the unmanned aerial vehicle, and the center line of the nozzle does not pass through the center axis of the fuselage of the unmanned aerial vehicle. As shown in the cross section in FIG. 2, the attitude adjustment nozzle 7 in this embodiment is composed of 4 nozzles, which are different from the center point x, the nozzle 1 and the nozzle 2 intersect at a point a, and the nozzle 3 and the nozzle 4 intersect at a point b, the center axis of each nozzle deviates from the center point of the fuselage of the unmanned aerial vehicle by an angle θ, and each nozzle can generate a pitching torque and a rolling torque. Assuming that the reaction thrust generated by the four nozzles are respectively $T_1$ to $T_4$, the center line of the nozzle deviates from the center of gravity of the unmanned aerial vehicle by a distance of L, and the radius of the fuselage section at the nozzle is R, then the torque generated by the attitude adjustment nozzle in the rolling direction is:

$$M_x = T_1 \cdot \sin \theta_1 - T_2 \cdot \sin \theta_2 + T_3 \cdot \sin \theta_3 - T_4 \cdot \sin \theta_4$$

The torque generated by the attitude adjustment nozzle in the pitching direction is:

$$M_y = (-T_1 - T_2 + T_3 + T_4) \cdot L$$

The torque generated by the attitude adjustment nozzle in the yawing direction is:

$$M_z = (T_1 - T_2 - T_3 + T_4) \cdot L$$

Through the combined control of the thrust of a plurality of nozzles, rotation torques in the rolling, pitching and yawing directions can be generated, thereby assisting the aerodynamic rudder surface to perform attitude control in a crushing or maneuvering flight state, and a main attitude adjustment torque can be provided during the vertical take-off and landing process.

Figure 3:
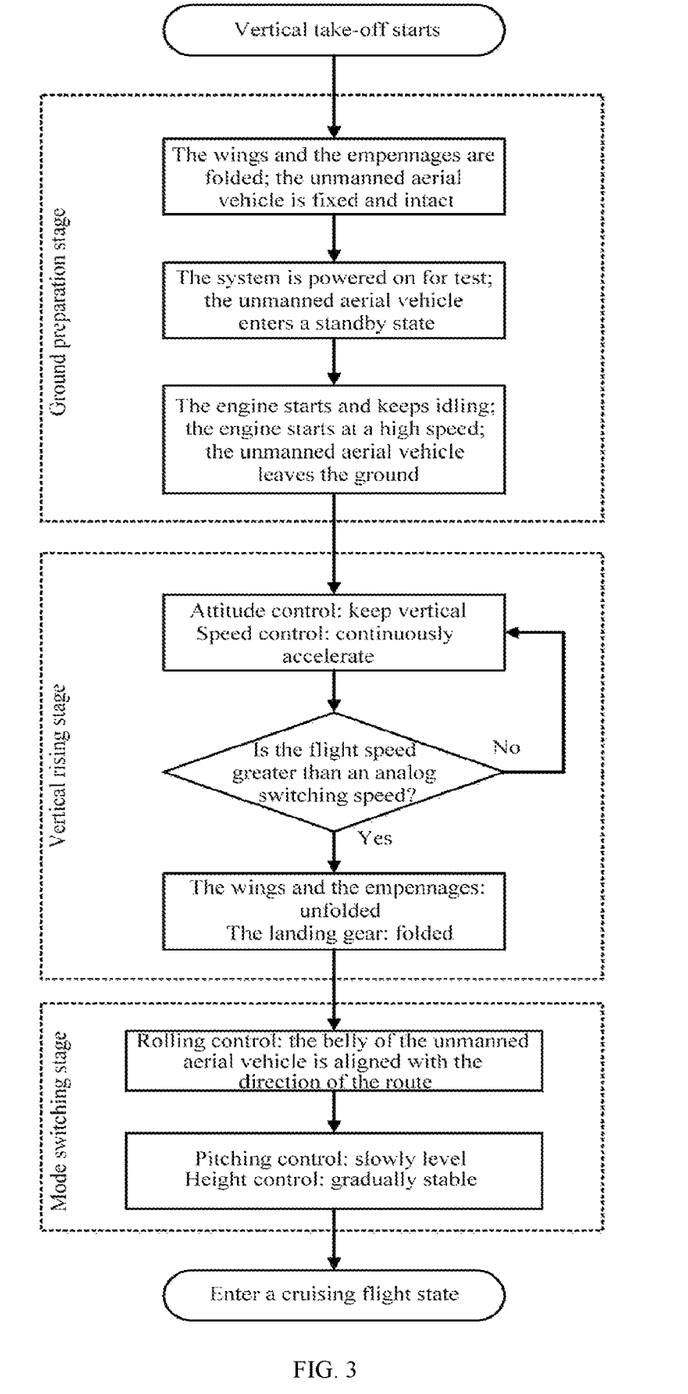
FIG. 3 is a vertical take-off control method of a tailstock type vertical take-off and landing unmanned aerial vehicle.

According to the method shown in FIG. 3, the vertical take-off process of the unmanned aerial vehicle is divided into three stages: ground preparation, vertical rising and mode switching. At the ground preparation stage, the wings 2 and the empennages 4 are all in a folded state; after the unmanned aerial vehicle is fixed and intact, the system is powered on, the test is completed and the unmanned aerial vehicle enters a standby state, the engine starts and keeps idling, after it is confirmed that the work is normal, the engine starts at a high speed, the rotating speed is gradually accelerated to a high speed state, after the thrust is greater than the gravity, the unmanned aerial vehicle leaves the ground and begins to enter the vertical rising stage. At the vertical rising stage, the position and attitude of the unmanned aerial vehicle are mainly regulated and controlled by the thrust of an engine vector nozzle (if any) and the attitude adjustment nozzle 7, after the flight speed is gradually increased to a specified mode switching speed, the wings 2 and the empennages 4 are unfolded, the landing gear 8 is folded, and the unmanned aerial vehicle enters the mode switching stage. At the mode switching stage, the engine maintains the high speed state, the rotation in the rolling direction is controlled through the attitude adjustment nozzle 7 at first, so that the belly of the unmanned aerial vehicle is aligned with the direction of the route, and then the attitude adjustment nozzle 7 and the elevator 51/52 are manipulated to slowly adjust the pitch angle from 90° during the vertical rising process to a trim value in a cruising state, and the flight height of the unmanned aerial vehicle gradually stabilizes until a cruising flight state is finally established.

Figure 4:
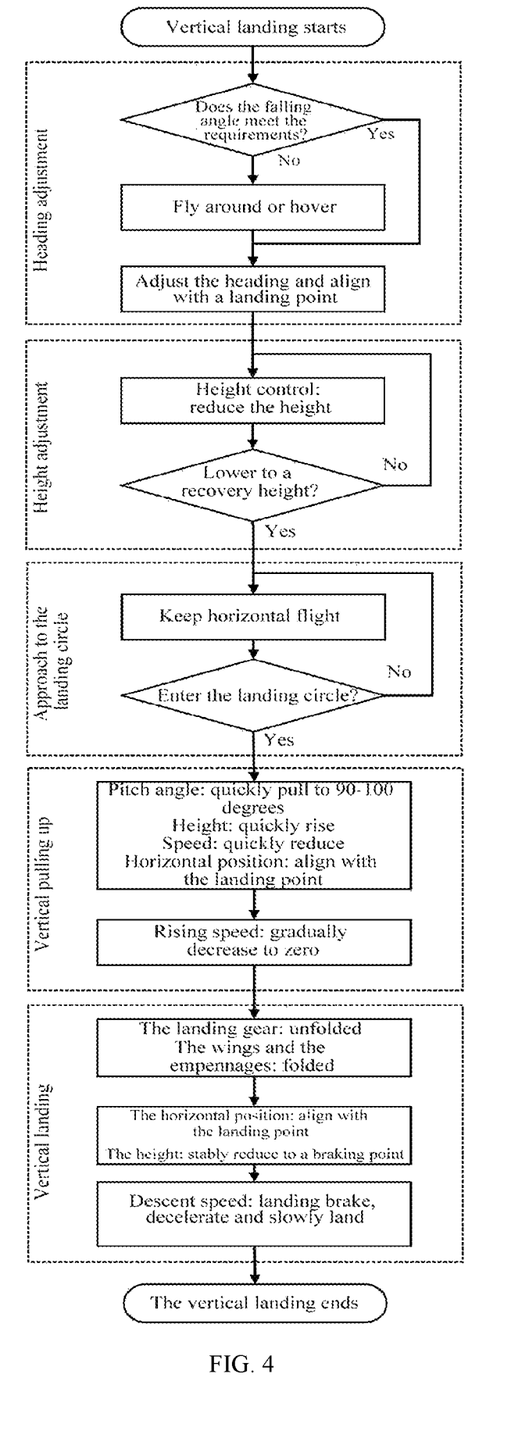
FIG. 4 is a vertical landing control method of a tailstock type vertical take-off and landing unmanned aerial vehicle.
Figure 5:
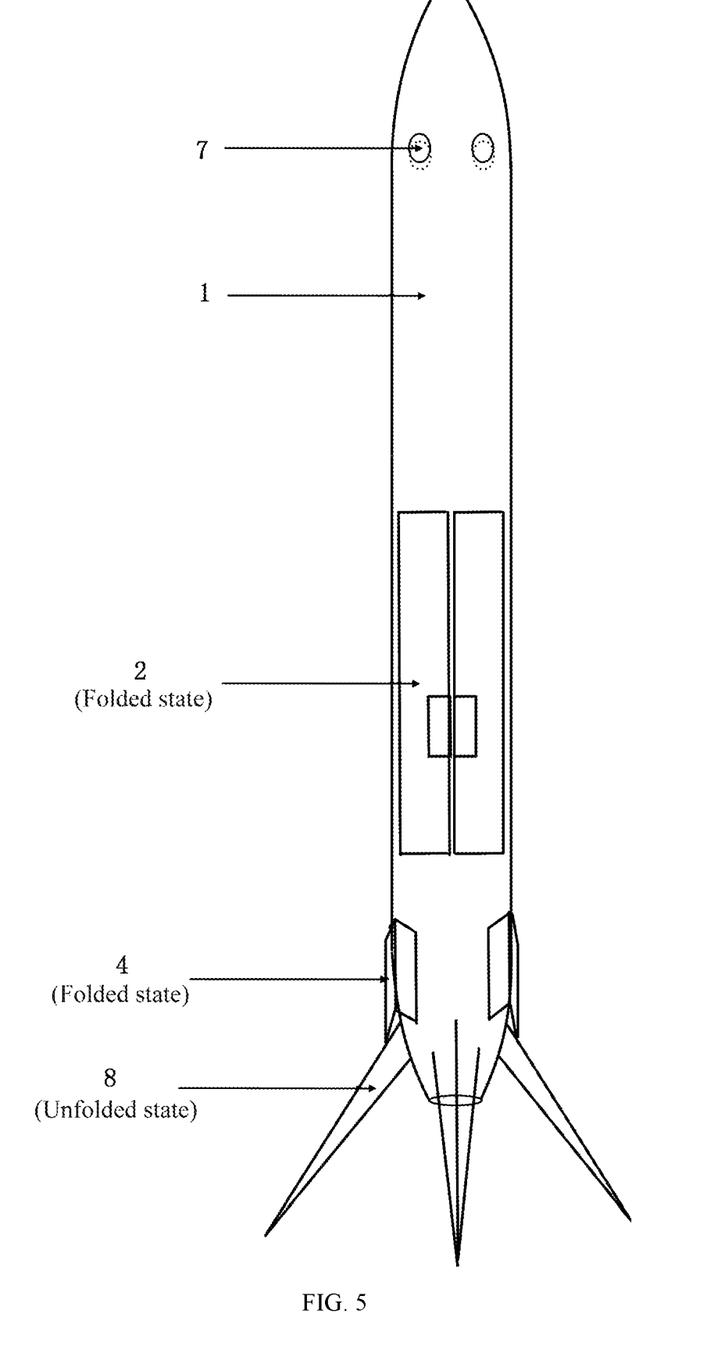
FIG. 5 is a schematic diagram of a vertical landing state of a tailstock type vertical take-off and landing unmanned aerial vehicle.
Figure 6:
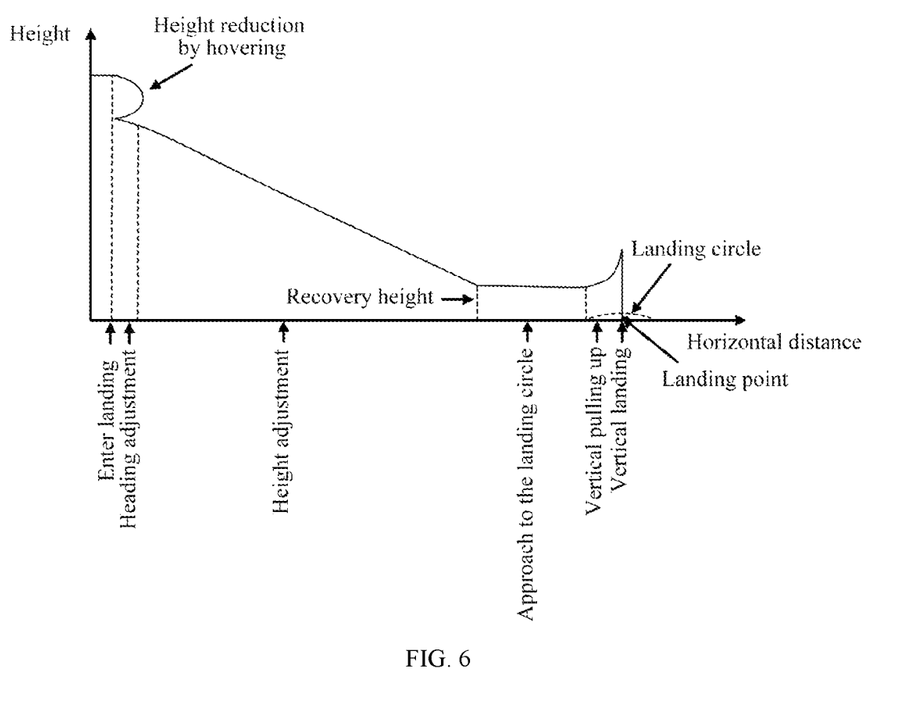
FIG. 6 is a height curve of a vertical landing control method.

According to the method shown in FIG. 4, the vertical landing process of the unmanned aerial vehicle is divided into five stages: heading adjustment, height adjustment, approaching to a landing circle, vertical pulling up and vertical landing. After entering recovery, the unmanned aerial vehicle firstly enters the heading adjustment stage, according to a horizontal distance to be flown and an height difference, and combined with the gliding angle of the unmanned aerial vehicle, whether the ratio of the height difference to the horizontal distance to be flown meets the requirements of the gliding angle is judged: if the horizontal distance is insufficient, the flight distance can be extended by flying around, so that the unmanned aerial vehicle can be lowered to a recovery height before flying to the landing point; after the horizontal distance to be flown meets the height reduction requirements, the heading of the unmanned aerial vehicle is adjusted, so that the unmanned aerial vehicle is aligned with the landing point, and then enters the height adjustment stage. The unmanned aerial vehicle maintains the heading, at the same time, the flight height is adjusted, so that the height is gradually decreased to the recovery height, and after lowering to the recovery height, the unmanned aerial vehicle keeps horizontal flight and gradually approaches to the landing circle, and then enters the vertical pulling up stage. By controlling the engine vector nozzle (if any), the attitude adjustment nozzle and the aerodynamic rudder surface (including two ailerons 3 and the elevator and the rudder 51/52), the pitch angle is quickly pulled to 90°-100°, the horizontal speed of the unmanned aerial vehicle will be rapidly decreased, and the unmanned aerial vehicle climbs rapidly at the same time; the attitude and position of the unmanned aerial vehicle are regulated and controlled during this process, so that the unmanned aerial vehicle is kept within the landing circle, and the horizontal position is close to the landing point as much as possible; the rotating speed of the engine, the engine vector nozzle (if any) and the attitude adjustment nozzle 7 are adjusted, so that the rising speed of the unmanned aerial vehicle is gradually decreased to zero, and then the unmanned aerial vehicle enters the vertical landing stage. The landing gear 8 is unfolded, the wings 2 and the empennages 4 are folded, and the rotating speed of the engine, the engine vector nozzle (if any) and the attitude adjustment nozzle 7 are adjusted, so that the unmanned aerial vehicle maintains a stable descent speed at the horizontal position of the landing point, and gradually reduces the height along the vertical direction; after the height of the unmanned aerial vehicle is reduced to a braking point, the rotating speed of the engine is increased, so that the descent speed is quickly reduced, and the unmanned aerial vehicle slowly lands to the landing point; and then the engine 6 quickly enters an idle state and is stopped after continuously working for a period of time, so as to complete the landing, the vertical landing state is shown in FIG. 5, and the height curve of the vertical landing process is shown in FIG. 6.

Figure 7:
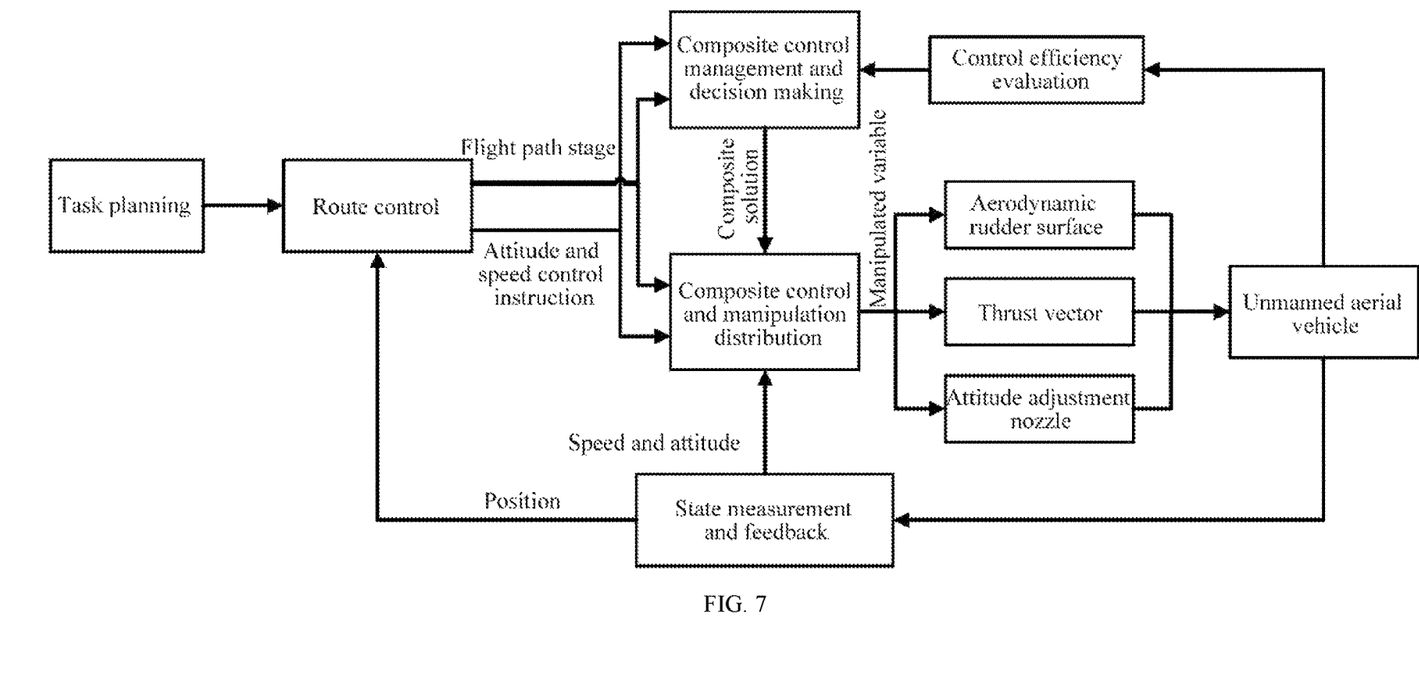
FIG. 7 is a structure diagram of posture control combining an aerodynamic force with reaction thrust.

According to the method shown in FIG. 7, the aerodynamic force generated by the rudder surface, the vector thrust generated by the engine vector nozzle and the reaction thrust generated by the attitude adjustment nozzle are combined for composite control. A composite control management and decision making module gives a composite control solution according to the a flight stage, and an attitude and speed control command given by a track controller; a composite control and manipulation distribution module calculates a required manipulation force and a manipulation torque according to the flight stage and a control deviation, and then distributes the manipulated variable of each actuator in combination with the model and the composite solution of each actuator; and a control efficiency evaluation module evaluates the effect of the control distribution result and the effect of the composite solution according to the response of the unmanned aerial vehicle, and assists the composite control management and decision making module to revise the composite solution.

The above-mentioned embodiment is only a optimal solution of the present invention, but it is not intended to limit the present invention. Those of ordinary skill in the relevant technical field can make various changes and modifications without departing from the spirit and scope of the present invention. Therefore, all technical solutions, obtained by equivalent substitutions or equivalent transformations, fall within the protection scope of the present invention.

What is claimed is:

1. A tailstock type vertical take-off and landing unmanned aerial vehicle, wherein the unmanned aerial vehicle comprises: a fuselage, wings, ailerons, empennages, an elevator, a rudder, an engine, an attitude adjustment nozzle, and a landing gear; the wings are symmetrically fixed on both sides of the middle of the fuselage, and the ailerons are hinged to trailing edges of the wings on the both sides; the empennages are located at the tail of the fuselage, and the elevator and the rudder are hinged to the trailing edges of the empennages; the engine is arranged at the tail of the fuselage for producing forward thrust; and the landing gear is arranged at the tail of the fuselage, capable of being automatically folded and unfolded, and configured to support the unmanned aerial vehicle;

the attitude adjustment nozzle is composed of a plurality of nozzles, which are distributed on an outer surface of the front of the fuselage, and capable of spraying gas outward to generate thrust and a rotation torque, so as to assist in adjusting an attitude of the unmanned aerial vehicle; the plurality of nozzles are distributed on the outer surface of the front of the fuselage, and are away from the center of gravity of the unmanned aerial vehicle by a set distance, the plurality of nozzles point to the outside of the fuselage for generating thrust and the rotation torque, so as to assist in adjusting the attitude of the unmanned aerial vehicle; the center lines of some or all of the plurality of nozzles do not pass through the center axis of the fuselage of the unmanned aerial vehicle; and thrust of each nozzle of the plurality of nozzles is capable of being independently controlled; and the wings are straight wing, arranged above or below the fuselage, and capable of being folded, unfolded and locked, and a sweepback of the wings is adjustable; the ailerons are composed of two or more ailerons hinged to the trailing edges of the left and right wings through rotating shafts, the left and right ailerons are symmetrically distributed, and the ailerons are capable of being deflected.

2. The tailstock type vertical take-off and landing unmanned aerial vehicle according to claim 1, wherein the empennages are arranged such that a vertical stabilizing plane and a horizontal stabilizing plane are independent of each other, that is, the empennages comprise one or more vertical empennages and one or more horizontal empennages; or the empennages are V-shaped empennages in which the vertical stabilizing plane and the horizontal stabilizing plane are coupled to each other; the empennages are eudipleural about the fuselage, and capable of being folded, unfolded and locked; and the elevator and the rudder are hinged to the trailing edges of the empennages through the rotating shafts, and capable of being deflected, so as to manipulate the unmanned aerial vehicle to realize pitching and rotation in a yawing direction.

3. The tailstock type vertical take-off and landing unmanned aerial vehicle according to claim 1, wherein the fuselage is designed as a streamline form with an eudipleural cross section, or is designed as a wing-body fusion body.

4. The tailstock type vertical take-off and landing unmanned aerial vehicle according to claim 1, wherein the engine is located at the tail of the fuselage and configured as one or more turbojet engines or turbofan engines, and comprises a fixed nozzle or a vector nozzle to improve the attitude and maneuver control flexibility, and the maximum available thrust of the engine is not less than the take-off weight of the unmanned aerial vehicle.

5. The tailstock type vertical take-off and landing unmanned aerial vehicle according to claim 1, wherein the landing gear is arranged at the tail of the fuselage, comprising a three-point or four-point supporting structure, and is capable of being folded and unfolded through mechanical parts; in a folded state, a fairing is arranged at the outside; after completing take-off, the landing gear is capable of being automatically folded, and the fairing is closed; and before landing, the landing gear is capable of being automatically unfolded.

6. A vertical take-off control method of the tailstock type vertical take-off and landing unmanned aerial vehicle according to claim 1, wherein a vertical take-off process of the unmanned aerial vehicle is divided into three stages: ground preparation, vertical rising and mode switching, and the take-off control method of each stage is as follows:

1) Ground preparation: the unmanned aerial vehicle takes off on an external launcher or its own landing gear, and the wings and the empennages are in the folded state before take-off; after the unmanned aerial vehicle is fixed and intact, a test is completed and the unmanned aerial vehicle enters a standby state, the engine starts and keeps idling, after it is confirmed that a work is normal, the engine starts at a speed, a rotating speed is gradually accelerated to a speed state, after the thrust is greater than the gravity, the unmanned aerial vehicle leaves the ground and begins to enter the vertical rising stage;

2) Vertical rising: a flight speed is gradually increased, before the flight speed reaches a specified mode switching speed, the wings and the empennages remain in the folded state all the time, the landing gear is always in an unfolded state, the position and attitude of the unmanned aerial vehicle are mainly regulated and controlled by the thrust of an engine vector nozzle and the attitude adjustment nozzle, after the flight speed is greater than the specified mode switching speed, the wings and the empennages are unfolded, the landing gear is folded, and the unmanned aerial vehicle enters the mode switching stage; and 3) Mode switching: the engine continues to maintain the speed state, firstly the rotation in the rolling direction is controlled through the attitude adjustment nozzle, so that the belly of the unmanned aerial vehicle is aligned with the direction of a route, and then the attitude adjustment nozzle and the elevator are manipulated to slowly adjust a pitch angle from 90° during a vertically rising process to a trim value in a cruising state, and during this process, a flight height of the unmanned aerial vehicle gradually stabilizes until a cruising flight state is finally established.

7. A vertical landing method of the tailstock type vertical take-off and landing unmanned aerial vehicle according to claim 1, wherein a vertical landing process of the unmanned aerial vehicle consists of five stages: heading adjustment, height adjustment, approaching to a landing circle, vertical pulling up and vertical landing, and the landing control method of each stage is as follows:

1) after the unmanned aerial vehicle enters recovery in a cruising state, entering the heading adjustment stage as follows: according to a horizontal distance to be flown between a current position and a landing point and an height difference, combined with the gliding angle of the unmanned aerial vehicle, determining whether the ratio of the height difference to the horizontal distance to be flown meets the requirements of the gliding angle, when the horizontal distance to be flown is insufficient, extending a flight distance by flying around, so that the unmanned aerial vehicle is capable of being lowered to a recovery height before flying to the landing point; and when the horizontal distance to be flown meets that the unmanned aerial vehicle is capable of being lowered to a recovery height before flying to the landing point, adjusting heading of the unmanned aerial vehicle until the unmanned aerial vehicle is aligned with the landing point, so that the unmanned aerial vehicle then enters the height adjustment stage;

2) after the heading of the unmanned aerial vehicle is aligned with the direction of the landing point, keeping the unmanned aerial vehicle flying in the heading, and adjusting a flight height at the same time, until the flight height is decreased to the recovery height, so that after the unmanned aerial vehicle is lowered to the recovery height, the unmanned aerial vehicle enters the stage of approaching to a landing circle;

3) keeping the unmanned aerial vehicle flying in a horizontal flight until the unmanned aerial vehicle approaches the landing circle, so that the unmanned aerial vehicle then enters the vertical pulling up stage;

4) pulling the unmanned aerial vehicle until the pitch angle is 90-100 degrees, by controlling an engine vector nozzle, the attitude adjustment nozzle, and an aerodynamic rudder surface, so that the horizontal speed of the unmanned aerial vehicle is decreased and the unmanned aerial vehicle climbs; and at the same time, regulating and controlling the attitude and position of the unmanned aerial vehicle, so that the unmanned aerial vehicle is kept within the landing circle, and the horizontal position is close to the landing point as much as possible; and adjusting a rotating speed of the engine, the engine vector nozzle and the attitude adjustment nozzle until a speed of rising of the unmanned aerial vehicle is decreased to zero, so that the unmanned aerial vehicle then enters the vertical landing stage; and 5) unfolding the landing gear, folding the wings and the empennages, adjusting the rotating speed of the engine, the engine vector nozzle and the attitude adjustment nozzle, so that the unmanned aerial vehicle maintains a descent speed at a horizontal position of the landing point, and reduces the height along the vertical direction; after the height of the unmanned aerial vehicle is reduced to a braking point, increasing the rotating speed of the engine to reduce the descent speed until the unmanned aerial vehicle lands to the landing point, so that the engine then enters an idle state; and stopping the engine after continuously working for a period of time, so as to complete the landing.

\* \* \* \* \*